2 Sheets—Sheet 1.
J. W. POWERS.
Fruit and Vegetable Evaporator.
No. 208,925. Patented Oct. 15, 1878.
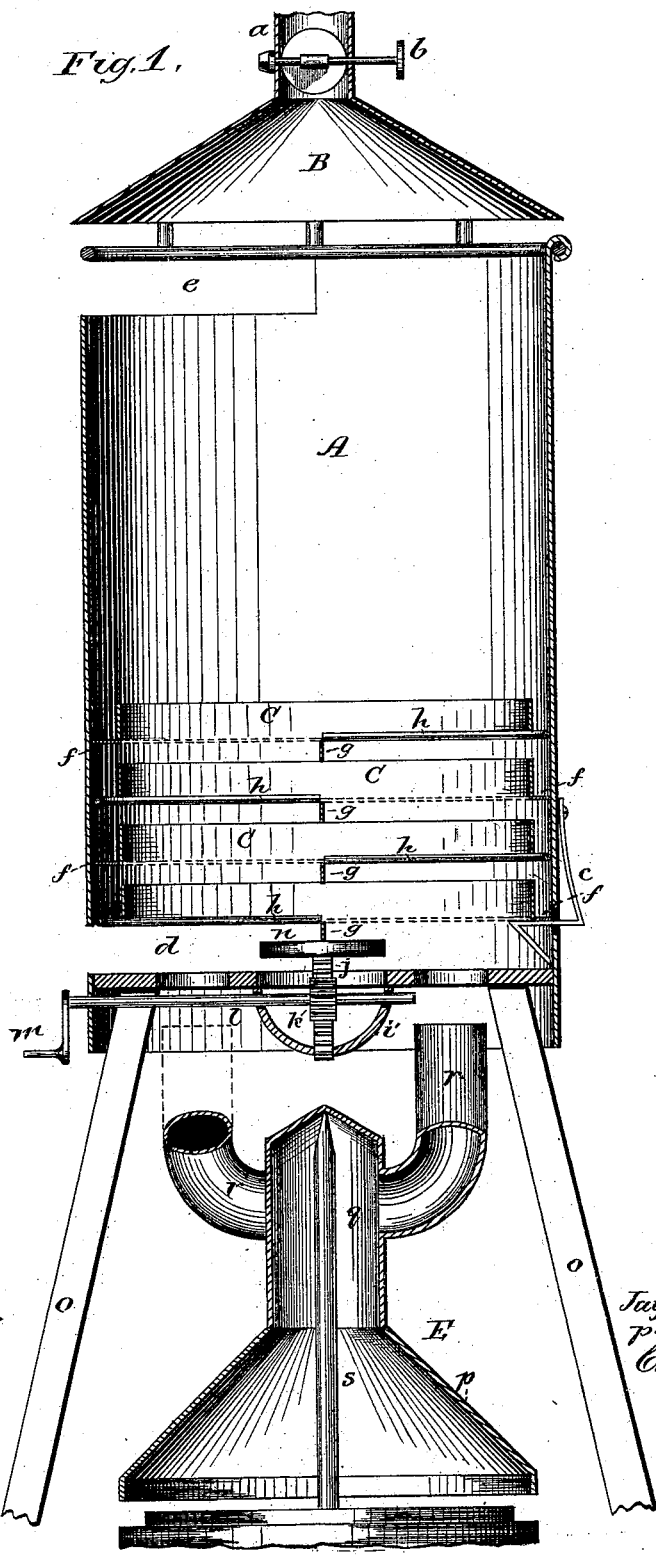
WITNESSES
Nat. E. Oliphant.
Wm W. Lewis.
INVENTOR
Jay W. Powers,
per
Chas. H. Fowler.
Attorney.

2 Sheets—Sheet 2.
J. W. POWERS.
Fruit and Vegetable Evaporator.
No. 208,925. Patented Oct. 15, 1878.
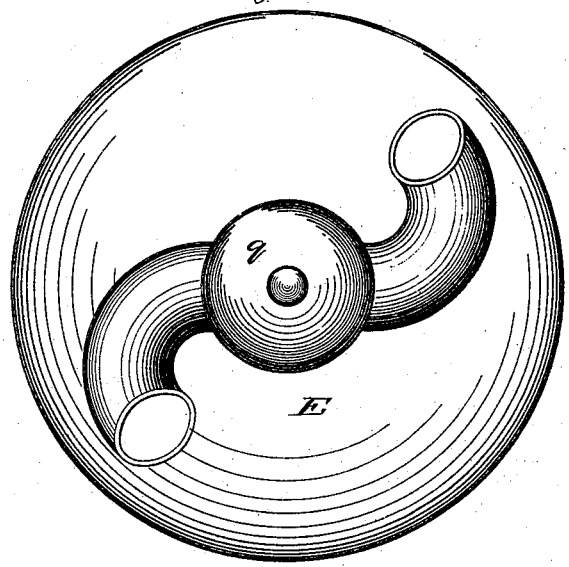
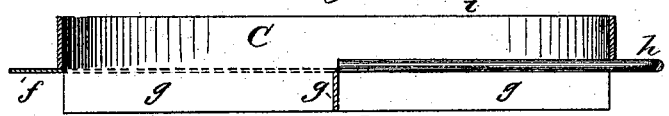
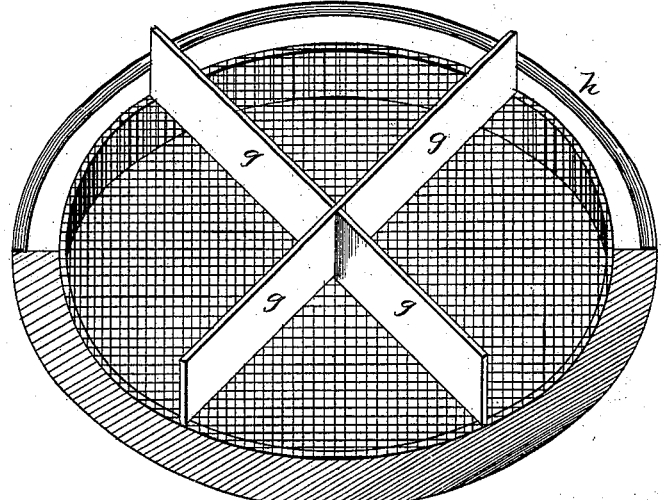
WITNESSES
Nat. E. Oliphant
Wm W Lewis
INVENTOR
Jay. W. Powers,
per Chas H Fowler,
Attorney.

UNITED STATES PATENT OFFICE.

JAY W. POWERS, OF CHICAGO, ILLINOIS.

IMPROVEMENT IN FRUIT AND VEGETABLE EVAPORATORS.

Specification forming part of Letters Patent No. 208,925, dated October 15, 1878; application filed February 9, 1877.

*To all whom it may concern:*

Be it known that I, JAY W. POWERS, of the city of Chicago, county of Cook and State of Illinois, have invented certain new and useful Improvements in Fruit and Vegetable Evaporators; and I do declare that the following is a full, clear, and exact description of the same, reference being had to the accompanying drawings, in which—

Figure 1 is a longitudinal vertical section of my invention; Fig. 2, a top-plan view of the revolving hood for distributing the heated air; Fig. 3, a vertical section of one of the trays for holding the fruit or vegetables, and Fig. 4 a bottom view of the tray in perspective.

This invention has relation to means or devices employed for the purpose of evaporating the moisture from fruit and vegetables; and the object or purpose thereof is to more effectually accomplish this end by the employment, in connection with a stove, furnace, or other suitable heating apparatus most convenient to generate heat, of an automatic hood, provided with curved pipes for the distribution of the heated air; also, a case or cylinder, with an arrangement of trays of peculiar construction for holding the fruit or vegetables, the construction and general arrangements of the several parts constituting my invention being hereinafter described, and subsequently pointed out in the claims.

In the accompanying drawings, A represents the case or cylinder, preferably of cylindrical form, and of any suitable metal, the same being provided with a cover, B, and so connected thereto as to admit of its being raised or lowered. The cover B is formed with a thimble, $a$, to which is connected a suitable damper, $b$, said thimble connecting with a pipe leading to the chimney or smoke-stack, for the purpose of creating a draft.

Secured upon the exterior of the case A are spring-rests $c$, the lower ends passing through openings in the case and forming supports for the lower one of a series of trays, C, which are placed within the case A through a suitable opening, $d$, and withdrawn through a similar opening, $e$, near the top of the case. These openings $d$ $e$, if desired, may be closed by suitable doors.

The trays C are provided with a flange, $f$, extending a part of the way around the outer periphery thereof, the object of which, when the several trays are in position, as illustrated in Fig. 1 of the drawing, is to check the upward current of hot air, which would otherwise pass between the side of the tray and the interior of the case A; but by the employment of the flange the air in its course is deflected or turned in a direction toward the center of the tray, and finds a free passage through the perforated bottom of the tray and around and above that side having no flange, or that portion having the guard $h$.

Cross-bars $g$ are secured to the under side of the trays, and project such a distance from the bottom that when the trays are placed one above the other the trays will be held a suitable distance apart, the bars resting upon the annular rim $i$ of the tray below it. The trays C have guards $h$ opposite the flanges $f$, which complete the circle therewith, and are a sufficient distance from the side of the tray to allow a space or open passage for the heated air in its upward course.

If desired, the trays may be provided with suitable handles for convenience of lifting and transporting them to or from the evaporator; and, in place of the wire-gauze forming the bottom of the tray, perforated sheet metal may be used.

The case A has around its lower end and secured within the same a grate, D, provided upon its under side with a bracket, $i'$, through which a rack-bar, $j$, works, said rack-bar being raised or lowered by a pinion, $k$, upon a shaft, $l$, to the outer end of which is attached a crank-handle, $m$, for operating it. To the upper end of the rack-bar $j$ is secured a circular disk, $n$, or a plate of any suitable form, which is caused to be lowered or raised by the rack and pinion.

The case A is supported by suitable standards or legs $o$, and below the case is a hot-air hood, E, having a funnel or bell shaped bottom, $p$, for collecting the hot air, and the body $q$ for transmitting the same; also, pipes $r$ for distributing the heated air under the fruit or vegetables. The pipes $r$ start horizontally from the body $q$, then curve upward and obliquely, for the purpose of giving motion to the hood when acted upon by the heated air in its upward course. A rod or upright spindle, s, projects from the heat-generating device upon which the hood E is supported and revolves.

Previous to evaporating the moisture from the fruit or vegetables they are carefully prepared and spread evenly upon the trays C, one of which is then passed through the opening d, the disk n being first lowered to a level with the grate D to admit said tray. The disk n is now raised, with the tray resting thereon, until said tray is caught and supported by the spring c, when the disk is again lowered to allow a second tray to be inserted with its flange f opposite that of the one above, which, in turn, is raised, together with the one above it, and so on until the case is full, when a tray may be removed through the opening e at the top of the case as an additional one is placed below.

Having now fully described the construction and operation of my invention, what I claim as new, and desire to secure by Letters Patent, is—

1. The combination, with a fruit or vegetable case or cylinder of an evaporator, of an air-discharging hood, E, having curved pipes r, said hood being operated by the heated air from a stove or other heat-generating device, substantially as and for the purpose set forth.

2. The trays C of a fruit or vegetable evaporator, provided with cross-bars g for retaining the trays a sufficient distance apart, and flanges f for checking the upward current of air and turning it toward the center of the tray and through the space between the guards h and outer rim of the trays, said trays being arranged in relation to each other within the case, substantially as specified.

JAY W. POWERS.

Witnesses:
A. MELICK,
WM. CHAPPELL.